(12) United States Patent
Zhang et al.

(10) Patent No.: US 12,167,341 B2
(45) Date of Patent: Dec. 10, 2024

(54) CONTROL SIGNALING FOR ROBUST PHYSICAL UPLINK SHARED CHANNEL TRANSMISSION

(71) Applicant: Apple Inc., Cupertino, CA (US)

(72) Inventors: Yushu Zhang, Beijing (CN); Wei Zeng, San Diego, CA (US); Dawei Zhang, Saratoga, CA (US); Haitong Sun, Irvine, CA (US); Weidong Yang, San Diego, CA (US); Sigen Ye, Whitehouse Station, NJ (US); Hong He, Cupertino, CA (US); Chunhai Yao, Beijing (CN)

(73) Assignee: Apple Inc., Cupertino, CA (US)

(*) Notice: Subject to any disclaimer, the term of this patent is extended or adjusted under 35 U.S.C. 154(b) by 399 days.

(21) Appl. No.: 17/442,047

(22) PCT Filed: May 15, 2020

(86) PCT No.: PCT/CN2020/090540
§ 371 (c)(1),
(2) Date: Sep. 22, 2021

(87) PCT Pub. No.: WO2021/227024
PCT Pub. Date: Nov. 18, 2021

(65) Prior Publication Data
US 2022/0303910 A1 Sep. 22, 2022

(51) Int. Cl.
*H04W 52/14* (2009.01)
*H04L 1/08* (2006.01)
(Continued)

(52) U.S. Cl.
CPC ............ *H04W 52/146* (2013.01); *H04L 1/08* (2013.01); *H04L 5/0051* (2013.01); *H04W 52/367* (2013.01); *H04W 74/0833* (2013.01)

(58) Field of Classification Search
CPC ............ H04W 52/146; H04W 52/367; H04W 74/0833; H04W 52/42; H04W 52/50;
(Continued)

(56) References Cited

U.S. PATENT DOCUMENTS

2018/0279297 A1 9/2018 Nogami et al.
2019/0053211 A1 2/2019 Ying et al.
(Continued)

FOREIGN PATENT DOCUMENTS

CN 109587708 A 4/2019
CN 110769502 2/2020
(Continued)

OTHER PUBLICATIONS

International Search Report for PCT Application No. PCT/CN2020/090540; Feb. 1, 2021.
(Continued)

*Primary Examiner* — Marisol Figueroa
(74) *Attorney, Agent, or Firm* — Kowert, Hood, Munyon, Rankin & Goetzel, P.C.

(57) ABSTRACT

This disclosure relates to techniques for providing control signaling for robust uplink data transmissions in a wireless communication system. A wireless device may be configured to perform an uplink transmission, including performing multiple repetitions of the uplink transmission. The wireless may select a beam for each repetition, and it may be the case that different repetitions are transmitted using different beams.

20 Claims, 8 Drawing Sheets

(51) Int. Cl.
*H04L 5/00* (2006.01)
*H04W 52/36* (2009.01)
*H04W 74/0833* (2024.01)

(58) Field of Classification Search
CPC ....... H04L 1/08; H04L 5/0051; H04L 1/1893; H04L 1/1896; H04B 7/0408; H04B 7/0404

See application file for complete search history.

(56) References Cited

U.S. PATENT DOCUMENTS

| | | | |
|---|---|---|---|
| 2019/0230683 A1 | 7/2019 | Akkarakaran | |
| 2019/0261281 A1* | 8/2019 | Jung | H04W 52/50 |
| 2019/0319823 A1 | 10/2019 | Aakkarakaran | |
| 2020/0107352 A1* | 4/2020 | Tsai | H04B 7/0617 |
| 2020/0396731 A1* | 12/2020 | Venugopal | H04L 5/0048 |
| 2021/0029708 A1* | 1/2021 | Khoshnevisan | H04W 80/02 |
| 2021/0219246 A1* | 7/2021 | Xu | H04W 52/325 |

FOREIGN PATENT DOCUMENTS

| | | | |
|---|---|---|---|
| EP | 35507733 A1 | 10/2019 | |
| WO | 2020020128 A1 | 1/2020 | |
| WO | WO-2021161285 A1 * | 8/2021 | ............ H04B 1/7143 |

OTHER PUBLICATIONS

Office Action for CN Patent Application No. 202080100864.4; Jun. 24, 2024.

* cited by examiner

CONTROL SIGNALING FOR ROBUST PHYSICAL UPLINK SHARED CHANNEL TRANSMISSION

PRIORITY CLAIM INFORMATION

This application is a U.S. National Stage application of International Application No. PCT/CN2020/090540, filed May 15, 2020, titled "Control Signaling for Robust Physical Uplink Shared Channel Transmission", which is hereby incorporated by reference in its entirety.

FIELD

The present application relates to wireless communications, and more particularly to systems, apparatuses, and methods for providing control signaling for robust physical uplink shared channel transmissions in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for providing control signaling for robust physical uplink shared channel transmissions in a wireless communication system.

According to the techniques described herein, a wireless device may be configured to perform an uplink communication repeatedly, potentially using multiple beams, e.g., in order to increase the robustness and reliability of the communication. According to various embodiments, the repetitions of the uplink communication may be configured to be multiplexed using time division multiplexing, frequency division multiplexing, and/or spatial division multiplexing.

In order to support such robust uplink transmissions, mechanisms for configuring various parameters, e.g., including parameters that may be new or may otherwise differ relative to more conventional uplink data transmission techniques, are described herein. For example, such mechanisms may include techniques for determining a multiplexing scheme to use for transmitting the repetitions, how many repetitions to transmit, which beam to use for which repetition, and power control parameters for transmitting the repetitions, among various techniques.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
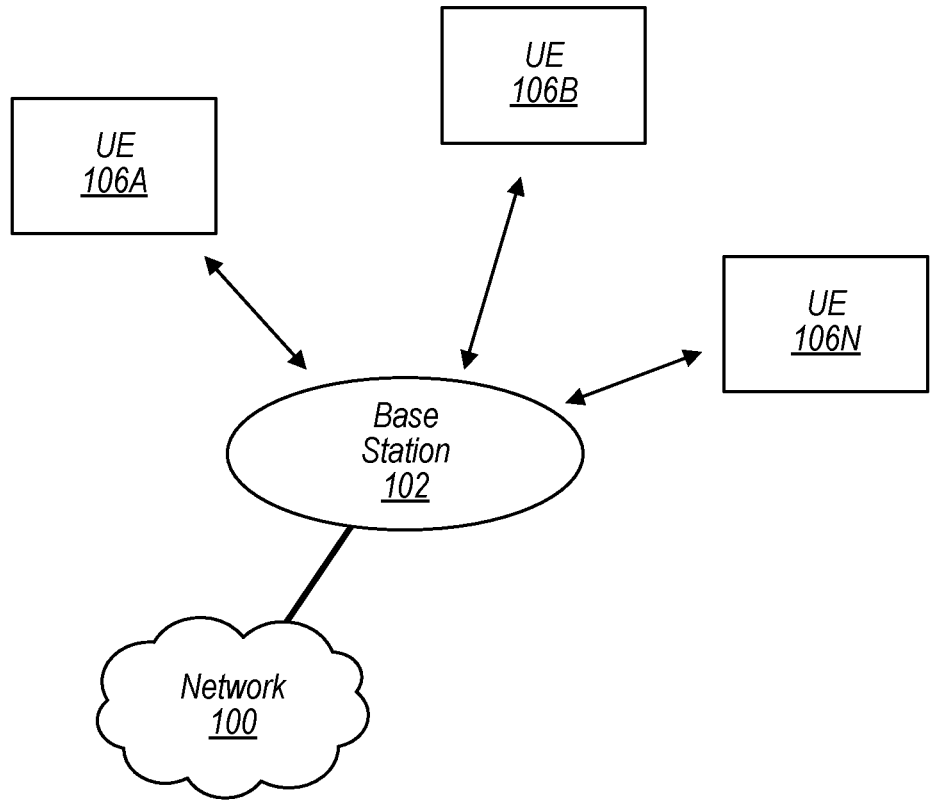
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set
QCL: Quasi-Co-Located or Quasi-Co-Location
CSI: Channel State Information
CSI-RS: Channel State Information Reference Signals Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
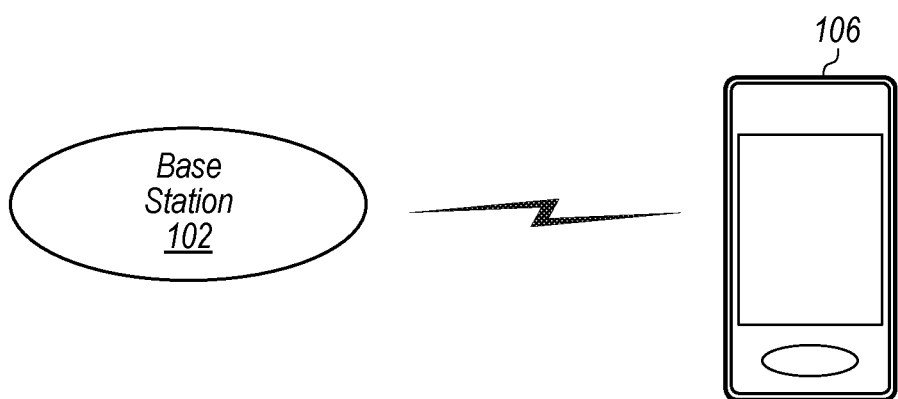
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform robust uplink data transmission techniques, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
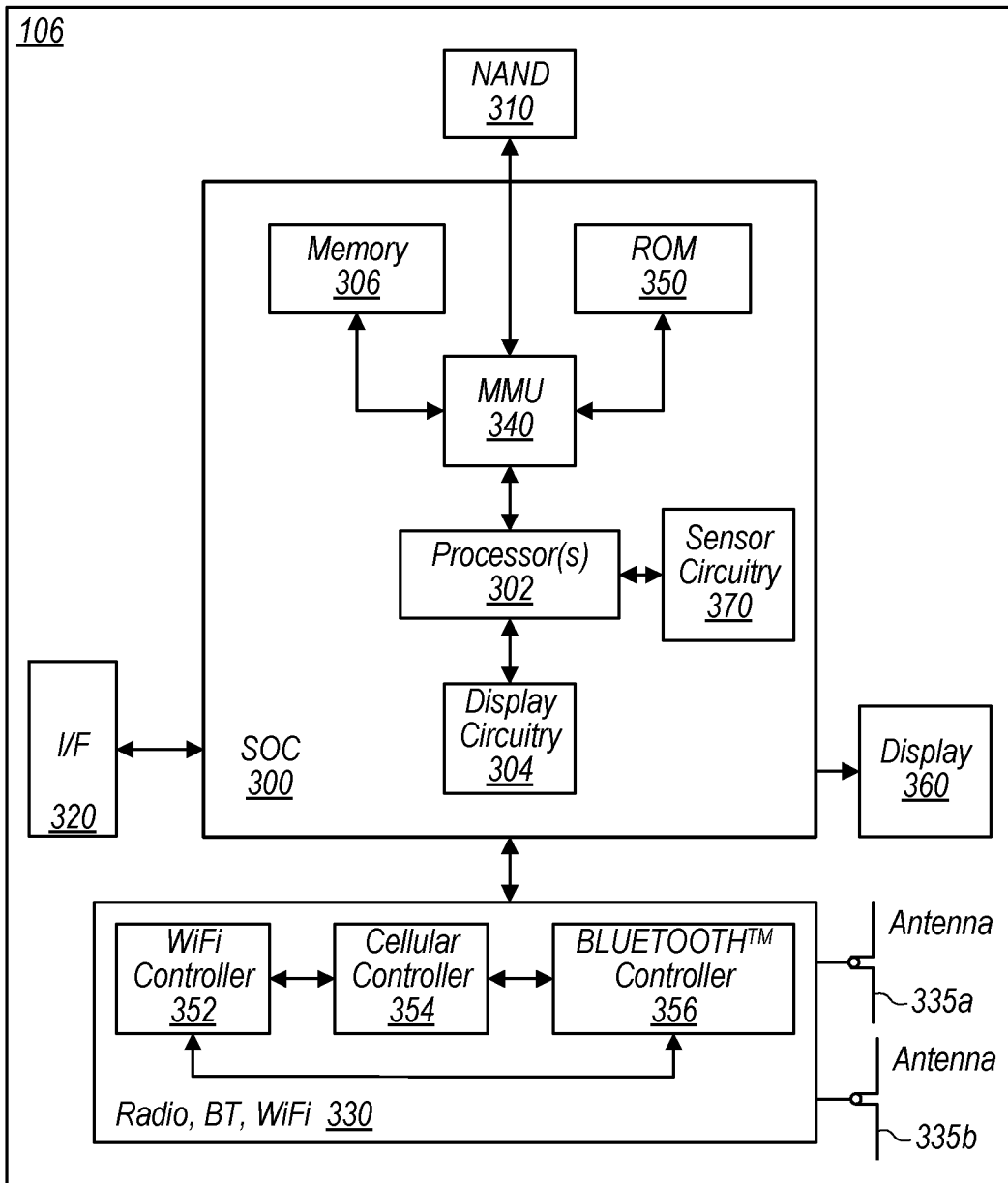
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform robust uplink data transmission techniques, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform robust uplink data transmission techniques according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
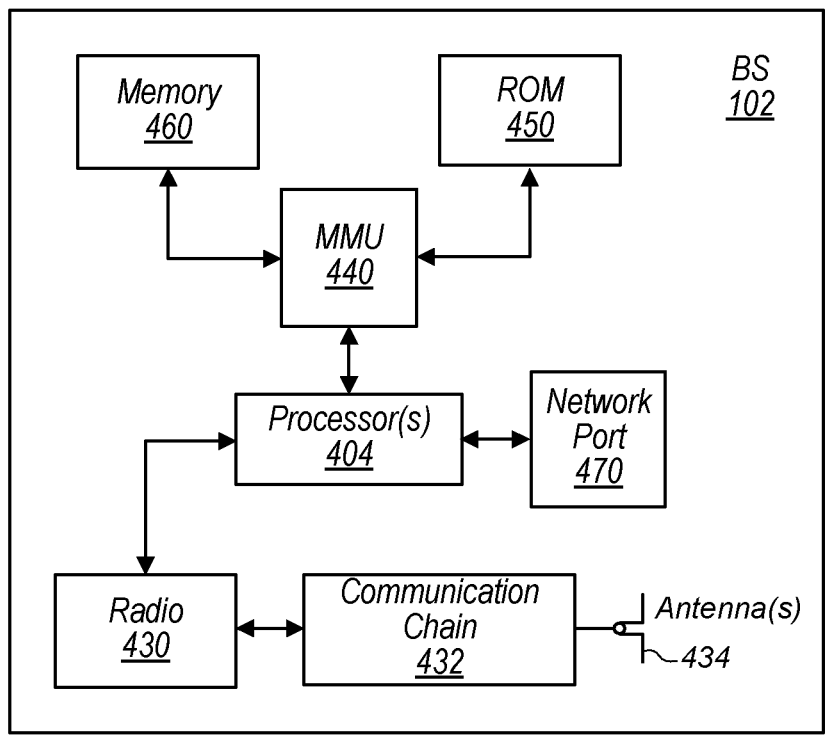
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Figure 5:
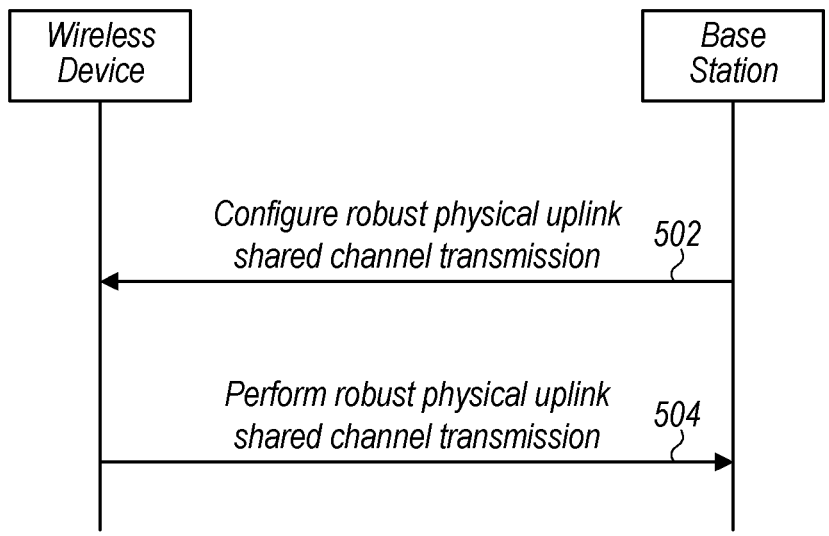
FIG. 5 is a flowchart diagram illustrating aspects of an exemplary possible method for providing control signaling for robust physical uplink shared channel transmissions in a wireless communication system, according to some embodiments.

FIG. 5—Control Signaling for Robust Uplink Data Transmission

Wireless communication is being used for an increasingly broad set of use cases. For at least some such types of communications, the robustness and reliability of the communications may be of particular importance. Accordingly, it may be useful to expand the range of types of communications that can be performed in a highly robust and reliable manner.

One such area may include uplink data communications, and/or other communications that may be performed on the physical uplink shared channel (PUSCH) of a cellular communication system. In particular, it may be beneficial, in at least some scenarios, to support the possibility of performing a PUSCH transmission repeatedly, and potentially using multiple beams, e.g., to increase the robustness and reliability of the PUSCH transmission.

Accordingly, FIG. 5 is a flowchart diagram illustrating a method for providing control signaling for such robust uplink data transmissions in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

The wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 502, the cellular base station may configure the wireless device to perform a robust PUSCH transmission. Configuring the robust PUSCH transmission may include indicating to the wireless device to perform multiple repetitions of the PUSCH transmission, possibly using multiple beams. The repetitions of the robust PUSCH transmission may be configured to be multiplexed, for example using one or more of time division multiplexing, frequency division multiplexing, or spatial division multiplexing. At least according to some embodiments, the cellular base station may indicate which multiplexing scheme(s) to use, and/or how many repetitions to perform, using higher layer signaling (e.g., RRC or MAC CE), or using downlink control information (DCI), among various possibilities.

The cellular base station may also configure one or more beams to use for the repetitions of the PUSCH transmission. At least according to some embodiments, the way in which the cellular base station performs beam configuration for the repetitions of the PUSCH transmission may depend at least in part on the method and manner in which the PUSCH transmission is scheduled.

For example, as one possibility, the PUSCH transmission may be scheduled using 3GPP DCI Format 0_0 (e.g., a fallback format). In such a scenario, the beam indication for the PUSCH transmission may be based on PUCCH resources with spatial relation configured by the DCI. Thus, in such a scenario, the wireless device may receive an indication of one or more PUCCH resources configured for the wireless device via the DCI, and may determine a beam to use for each repetition of the uplink transmission based at least in part on the PUCCH resource(s). For example, if one PUCCH resource is configured, the repetitions of the PUSCH transmission may use the same beam as is configured for the PUCCH resource; if multiple PUCCH resources (e.g., with different beams) are configured, one or more repetitions of the PUSCH transmission may use the same beam as is configured for one of the PUCCH resources, while one or more repetitions of the PUSCH transmission may use the same beam as is configured for another of the PUCCH resources. Such associations between PUCCH resource beams and PUSCH repetitions may be made in a one-to-one manner (e.g., the beam of one PUCCH resource may be used for one PUSCH repetition), or in a one-to-many manner (e.g., the beam of one PUCCH resource may be used for multiple PUSCH repetitions), e.g., depending on how many PUCCH resources are configured, how many PUSCH repetitions are configured, configuration (e.g., via RRC, MAC CE, or DCI) by the cellular base station, and/or 3GPP specifications, at least according to some embodiments.

Alternatively, if the DCI Format 0_0 does not include PUCCH resources with spatial relation configured by the DCI, the beam indication for the PUSCH transmission may be based on the control resource set(s) (CORESET(s)) or active transmission configuration indicator (TCI) states configured for the wireless device by the cellular base station. In such a scenario, the wireless device may determine a beam to use for each repetition of the uplink transmission based at least in part on the CORESET(s) or active TCI(s) that are configured. For example, if one CORESET or active TCI state is configured, the repetitions of the PUSCH transmission may use the same beam as is configured for the CORESET or active TCI state; if multiple CORESET(s) or active TCI(s) (e.g., with different beams) are configured, one or more repetitions of the PUSCH transmission may use the same beam as is configured for one of the CORESET(s) or active TCI(s), while one or more repetitions of the PUSCH transmission may use the same beam as is configured for another of the CORESET(s) or active TCI(s), and so on. The mapping between such CORESET/TCI beams and PUSCH repetitions may be one-to-one or one-to-many, and may be predefined (e.g., in 3GPP specifications) or configured by the cellular base station (e.g., via RRC, MAC CE, or DCI), possibly further based at least in part on how many CORESETs or active TCIs are configured and how many PUSCH repetitions are configured.

As another possibility, the PUSCH transmission may be scheduled using 3GPP DCI Format 0_1, or by a configured grant. In such a scenario, the beam indication may include an indication of one or more sounding reference signal (SRS) resources associated with the uplink transmission. For example, the wireless device may receive an indication of one or more SRS resource indicators (SRIs), and may determine a beam to use for each repetition of the uplink transmission based at least in part on the SRI(s). In some instances, the beam indication signaling may include multiple SRIs; as another possibility, the beam indication signaling could include one SRI that is associated with multiple SRS resources; as a still further possibility, the beam indication signaling could include one SRS resource set indicator associated with some or all of the SRS resources in a SRS resource set. In each such scenario, it may be the case that the wireless device can select a beam associated with a SRS resource indicated by the beam indication for each repetition of the uplink transmission. Thus, if multiple SRS resources are indicated (e.g., each potentially being associated with a different beam), different beams may be selected for different repetitions of the uplink transmission. As one possibility, the number of repetitions may be equal to or less than the number of indicated SRS resources, and the beam mapping between SRS resources and PUSCH transmission repetitions may be one-to-one (e.g., with only a certain subset of the SRS resources being mapped to PUSCH transmission repetitions). As another possibility, the number of indicated SRS resources may be less than the number of PUSCH transmission repetitions, and the mapping may be one-to-many, according to any of various mapping approaches, which could be signaled (e.g., by higher layer signaling, such as RRC or MAC CE) to the wireless device by the cellular base station, or could be predefined (e.g., in 3GPP specifications). For example, a localized mapping approach (e.g., with repetitions using the same beam clustered) or a distributed mapping approach (e.g., with repetitions using the same beam interleaved by repetitions using a different beams) could be configured, among various possibilities.

As a still further possibility, the PUSCH transmission may be associated with a physical random access channel (PRACH) transmission, e.g., as part of a 2-step random access channel (RACH) procedure. In such a scenario, the wireless device may select which beam to use for each PUSCH repetition based at least in part on the PRACH resource(s) associated with the PUSCH transmission. For example, one or more of the PUSCH repetitions may be associated with each PRACH resource, and the beam selected for each of those PUSCH repetitions may be spatially correlated (e.g., the same as, or otherwise related to in a configured or predefined manner) with the beam used for the associated PRACH resource.

According to some embodiments, the cellular base station may also configure one or more power control parameters to use for the repetitions of the PUSCH transmission. As one possibility, the power control parameters may be configured commonly across the repetitions of the PUSCH transmission. For example, the power control parameters associated with one SRI/TCI could be used, where the relevant SRI/TCI could be predefined (e.g., SRI/TCI with lowest or highest ID, or SRI/TCI corresponding to the first or last repetition, etc.), or could be configured (e.g., by higher layer signaling such as RRC or MAC CE, or by DCI).

As another option, one or more power control parameters may differ between different repetitions of the PUSCH transmission. For example, the pathloss reference signal (PL-RS) and/or any of various other possible power control parameters could be configured to be different for different repetitions of the PUSCH transmission.

In some instances (e.g., if the repetitions of the PUSCH transmission are frequency division multiplexed or spatial division multiplexed), it could be the case that the transmission power for the PUSCH transmission (e.g., according to the configured power control parameters) could exceed a certain (e.g., regulatory, device specific, etc.) transmission power threshold. In such a scenario, the wireless device may determine to reduce the transmission power for the PUSCH transmission to be below the transmission power threshold. To do so, the wireless device may determine to reduce the transmission power for each repetition of the PUSCH transmission using a common scaling factor, as one possibility. As another possibility, the wireless device may determine to reduce the transmission power for only a subset of the PUSCH repetitions (e.g., one repetition, as one possibility) to reduce the transmission power for the PUSCH transmission to be below the transmission power threshold.

In 504, the wireless device may perform the robust PUSCH transmission in accordance with the configuration information received from the cellular base station. This may include performing multiple repetitions in accordance with number of repetitions configured by the cellular base station, using a multiplexing scheme configured by the cellular base station. The repetitions of the PUSCH transmission may potentially be transmitted using multiple beams, in accordance with a (e.g., explicit or implicit) beam signaling indication for the PUSCH transmission, and using power control parameters as configured by the cellular base station, possibly modified to meet any transmission power limitations for the wireless device, at least according to some embodiments.

Thus, the method of FIG. 5 may be used to provide a framework for configuring and performing robust PUSCH transmissions in a cellular communication system. At least according to some embodiments, such a framework may help improve the likelihood of the PUSCH transmission being successfully received and decoded by the cellular network, which may be useful in various mission-critical applications and/or other scenarios in which highly reliable uplink communications are desired, at least in some instances.

FIGS. 6-10 and Additional Information

FIGS. 6-10 illustrate further aspects that might be used in conjunction with the method of FIG. 5 if desired. It should be noted, however, that the exemplary details illustrated in and described with respect to FIGS. 6-10 are not intended to be limiting to the disclosure as a whole: numerous variations and alternatives to the details provided herein below are possible and should be considered within the scope of the disclosure.

In 3GPP Release 15 and Release 16, it may be the case that a PUSCH beam indication can be scheduled using DCI Format 0_0, DCI Format 0_1, configured grant, or the PUSCH may be associated with a PRACH in 2-step RACH mode.

In case of the PUSCH being scheduled by DCI Format 0_0, if there is a PUCCH resource with spatial relation configured, the PUSCH beam may be based on the PUCCH beam. Otherwise, the PUSCH beam may be based on the beam of a CORESET with a lowest ID, or, if there is no CORESET configured, the PUSCH beam may be indicated by an active transmission configuration indication (TCI) for the PDSCH.

In case of the PUSCH being scheduled by DCI Format 0_1, if multiple SRS resources are configured for the current transmission scheme (e.g., codebook or non-codebook), the PUSCH beam may be based on the beam of one of those SRS resources, which may be indicated by a SRS resource indicator (SRI) in the DCI. If 1 SRS resource is configured, the PUSCH beam may be based on the SRS beam.

In case of the PUSCH being scheduled by a configured grant, it may be the case that the PUSCH beam is based on the beam of a SRS resource indicated by srs-ResourceIndicator in RRC.

In case of the PUSCH being associated with a PRACH in 2-step RACH mode, it may be the case that the PUSCH beam is based on the PRACH beam.

Additionally, in 3GPP Release 15 and Release 16, there may be several possible approaches to determining the power control parameters, such as P0, alpha, pathloss reference signal (PL-RS), and closed-loop power control (CL-PC) process index. For example, as one possibility, if DCI Format 0_0 is used, it may be the case that P0, alpha, and CL-PC are based on default power control parameters and PL-RS is based on the beam indication signal. As another possibility, if DCI Format 0_1 is used, all power control parameters may be determined based at least in part on SRI, e.g., where different SRI values could be associated with different power control parameter sets, and the associations between them can be configured by higher layer signaling such as RRC signaling or MAC CE. As a still further possibility, if PUSCH scheduling is by configured grant or associated with a PRACH, it may be the case that all power control parameters are configured by RRC signaling, at least according to some embodiments.

In some instances, it may be useful to support more robust and reliable PUSCH transmission techniques, such as by configuring PUSCH transmission repeatedly, potentially using different beams for different repetitions. In order to provide such support, it may be important to consider how to multiplex the PUSCH repetitions. Another consideration may include how to determine the control signaling for beam indication for each PUSCH repetition. Further, it may be useful to consider how to determine the transmission power (and the power control parameters more generally) for each repetition.

With respect to multiplexing, it may be possible to use a time division multiplexing (TDM) scheme, a frequency division multiplexing (FDM) scheme, and/or a spatial division multiplexing (SDM) scheme. The multiplexing scheme and/or number of PUSCH repetitions for one PUSCH transmission occasion may be configured by higher layer signaling, such as RRC or MAC CE, or using DCI, according to various embodiments.

For a TDM scheme, the PUSCH repetitions could be multiplexed within a slot or across slots, in a manner that could be predefined (e.g., in 3GPP specifications) or configured by higher layer signaling and/or DCI. For PUSCH repetitions within a slot, it could be the case that resource mapping type B (e.g., such as described in 3GPP TS 38.214) is applied. The offset between each repetition could be predefined or configured by higher layer signaling.

For a FDM scheme, different frequency resources may be allocated to different repetitions. To allocate those resources, the starting RB/RBG index and ending RB/RBG index for each repetition can be indicated, which can be configured separately or jointly.

For a SDM scheme, demodulation reference signal (DMRS) ports corresponding to different code division multiplexing (CDM) groups could be allocated to different repetitions.

For each such scheme, it may be the case that beam indication signaling could configure one or more beams for the PUSCH transmission. The manner in which such beams are configured may depend on the type of PUSCH scheduling in use.

For example, for a PUSCH transmission scheduled by DCI format 0_0 (e.g., fallback format), if at least one PUCCH resource is configured, the beam of each PUSCH repetition may be based on that of the PUCCH resource(s). If multiple different PUCCH resources are configured, different PUSCH repetitions may be mapped to different PUCCH resources. Otherwise, the beam of each PUSCH repetition could be based on that of a CORESET or active TCI state. Different PUSCH repetitions may be mapped to different CORESETs or active TCI states. The mapping between PUSCH repetitions and PUCCH resources and/or CORESETs/active TCI states can be predefined or configured by higher layer signaling, according to various embodiments.

Figure 6:
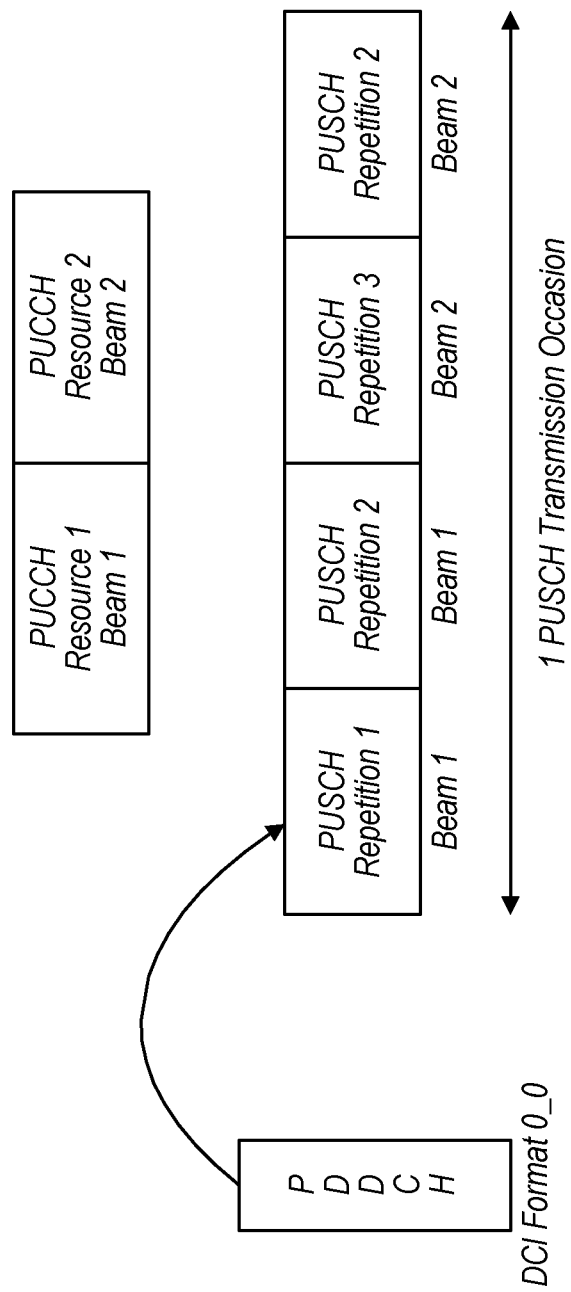
FIGS. 6-10 illustrate aspects of various possible example approaches to providing control signaling for robust uplink data transmissions, according to some embodiments.

FIG. 6 illustrates aspects of an example scenario in which such a mapping between PUCCH resources and PUSCH repetitions is used with a PUSCH transmission scheduled using DCI format 0_0. As shown, in this example scenario, a UE may receive 2 PUCCH resources configured with 2 different beams via a PDCCH communication. For a robust PUSCH transmission configured by the DCI, 2 repetitions may be performed using the beam corresponding to the first PUCCH resource, and 2 additional repetitions may be performed using the beam corresponding to the second PUCCH resource.

As another example, for a PUSCH transmission scheduled by DCI format 0_0 or configured grant, the gNB may be able to indicate multiple beams to the UE by higher layer signaling (e.g., RRC or MAC CE), or by DCI. Such beam indication signaling could include multiple SRIs, or one SRI associated with multiple SRS resources, or one SRS resource set indicator associated with a subset of or all SRS resources in a SRS resource set. In the latter instance, the SRS resources that are applicable to the PUSCH repetitions could be selected and indicated by higher layer signaling (e.g., RRC or MAC CE); alternatively, the applicable SRS resources could be predefined; for example, the first min $(N_{SRS}, N_{rep})$ SRS resources of a SRS resource set could be mapped to the PUSCH repetitions, where $N_{SRS}$ indicates the number of SRS resources in a SRS resource set, and $N_{rep}$ indicates the number of PUSCH repetitions. As a further possibility, multiple TCIs could be used for the beam indication signaling for a PUSCH transmission. The mapping between SRI/TCIs and PUSCH repetitions could be predefined or configured by higher layer signaling, in accordance with various possibilities. For example, according to one possible configuration, the number of repetitions may be equal to the number of indicated SRIs/TCIs, and they may be mapped 1:1. According to another possible configuration, the number of repetitions could be more than the number of indicated SRIs/TCIs, and the mapping could be either localized or distributed; for example, in a scenario in which there are 4 repetitions and 2 beams, the mapping could be #1 #1 #2 #2, or #1 #2 #1 #2, among various possibilities.

Figure 7:
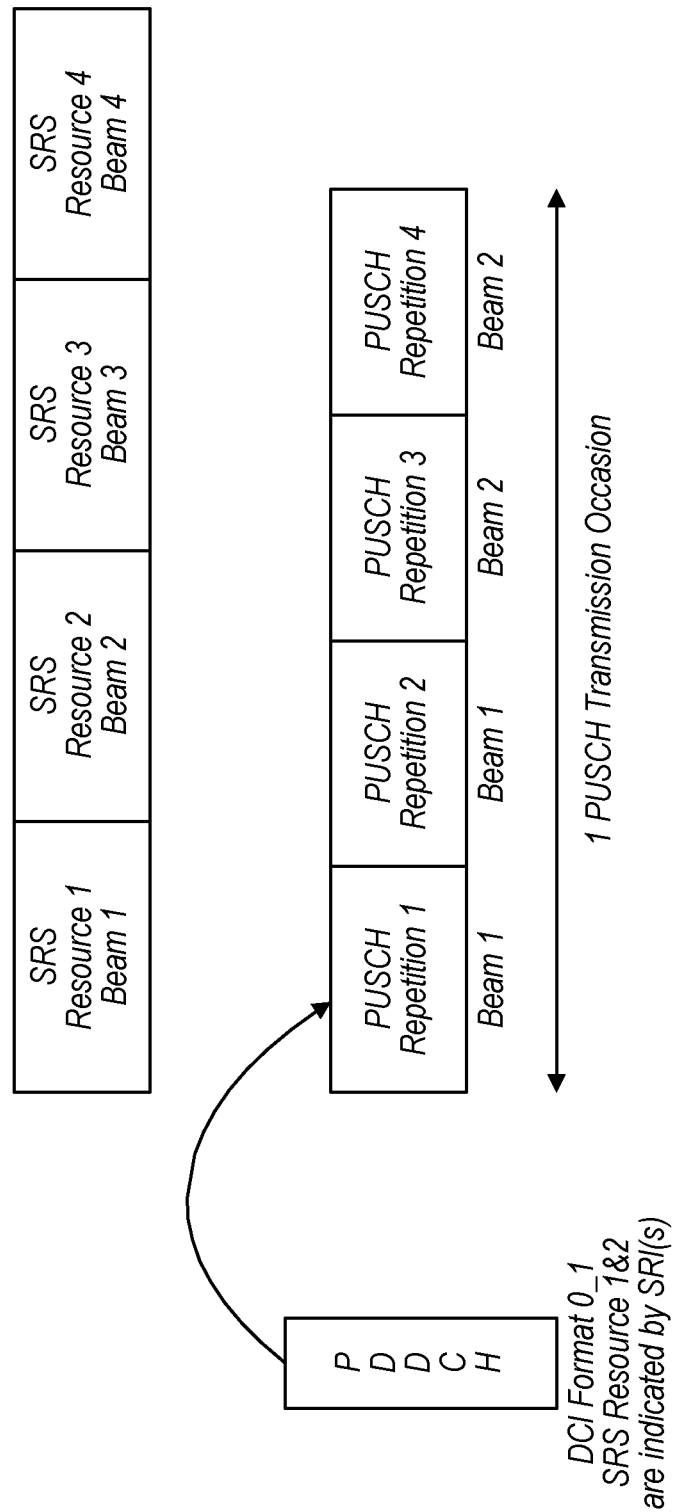
Figure 8:
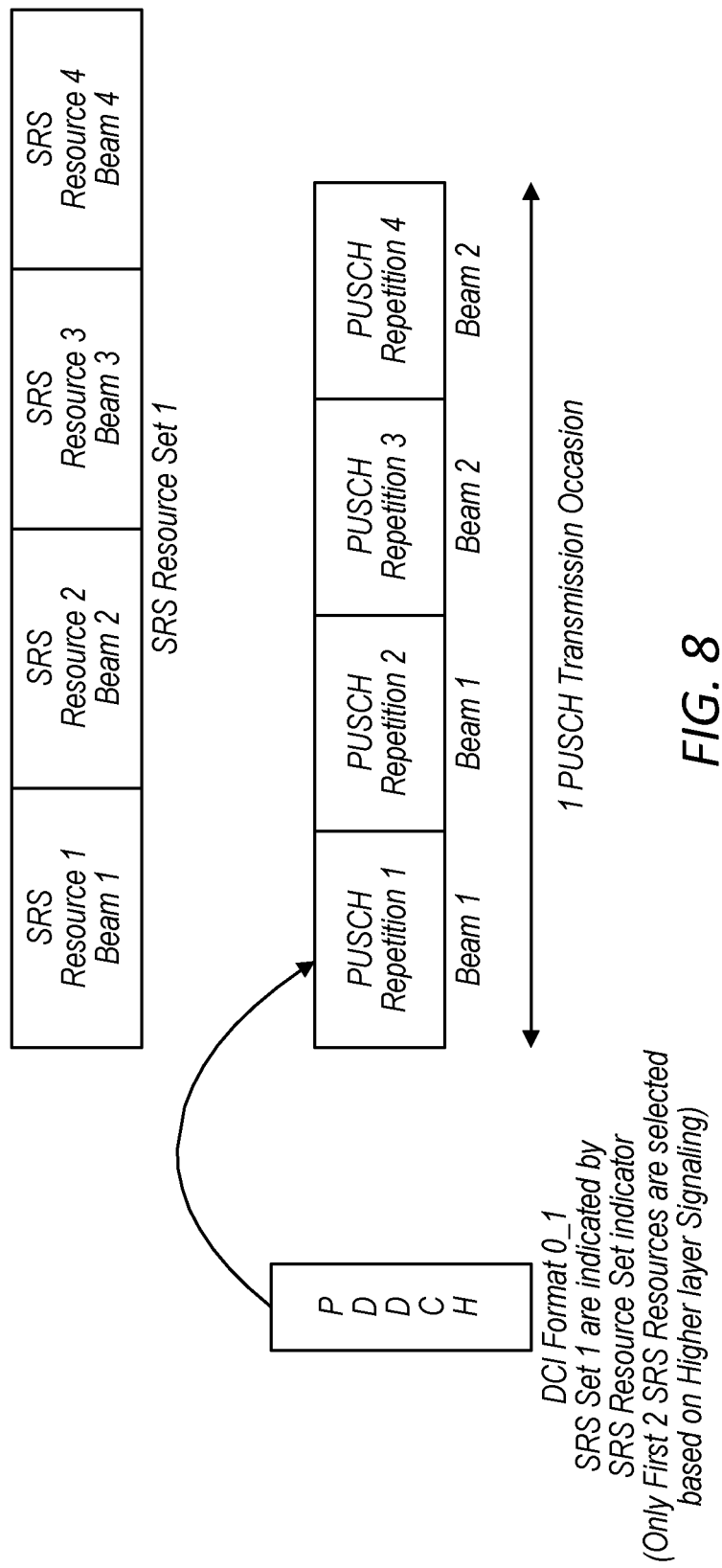
Figure 9:
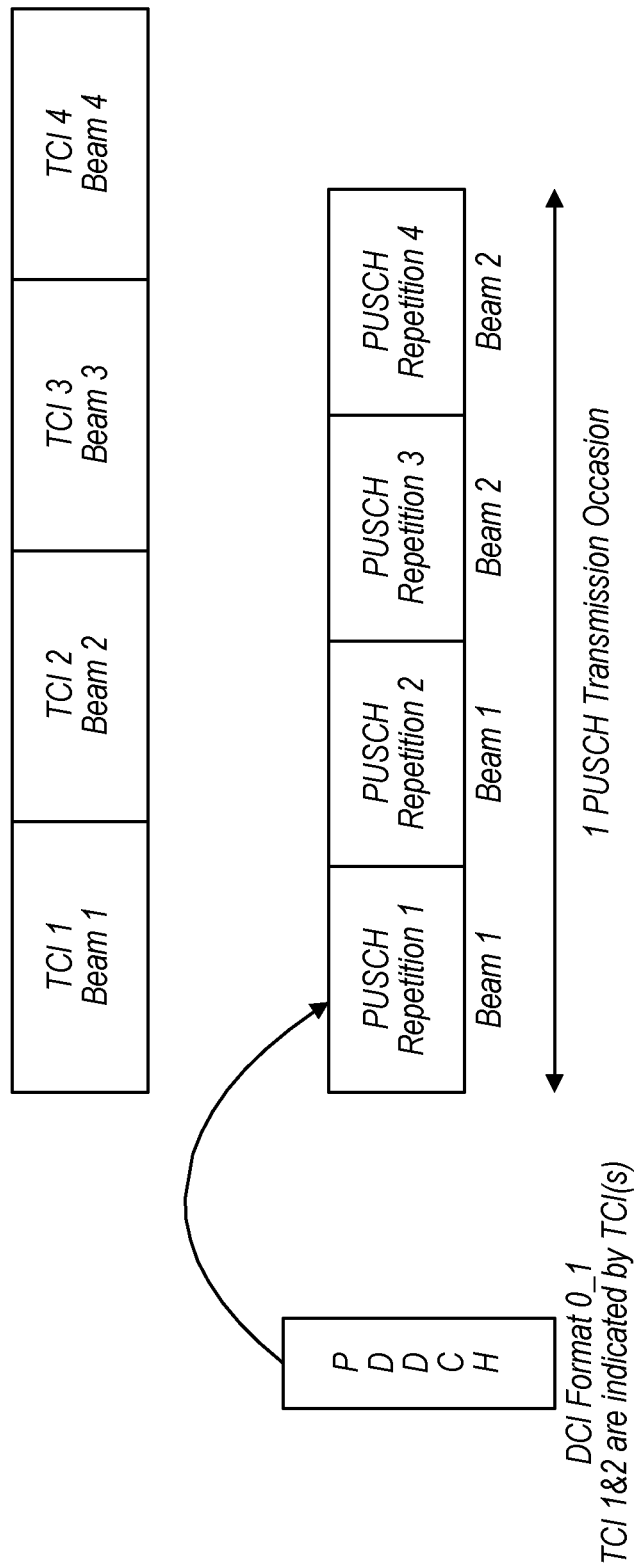

FIGS. 7-9 illustrate aspects of various example scenarios in which mapping between SRS/TCIs and PUSCH repetitions is used with a PUSCH transmission scheduled using DCI format 0_1.

As shown, in the example of FIG. 7, a UE may receive a DCI format 0_1 communication indicating by SRIs to use SRS resources 1 & 2 (e.g., of 4 SRS resources) for a robust PUSCH transmission via a PDCCH communication. For the robust PUSCH transmission configured by the DCI, 2 repetitions may accordingly be performed using the beam corresponding to the first SRS resource, and 2 additional repetitions may be performed using the beam corresponding to the second SRS resource.

In the example of FIG. 8, a UE may receive a DCI format 0_1 communication including a SRS resource set indicator for a SRS resource set that includes 4 SRS resources for a robust PUSCH transmission via a PDCCH communication. Per higher layer signaling (not shown), it may be the case that only the first 2 SRS resources of the SRS resource set are selected for the PUSCH transmission. Accordingly, 2 repetitions of the PUSCH transmission may be performed using the beam corresponding to the first SRS resource, and 2 additional repetitions may be performed using the beam corresponding to the second SRS resource.

In the example of FIG. 8, a UE may receive a DCI format 0_1 communication indicating to use TCIs 1 & 2 (e.g., of 4 TCIs) for a robust PUSCH transmission via a PDCCH communication. Accordingly, 2 repetitions of the PUSCH transmission may be performed using the beam corresponding to the first TCI, and 2 additional repetitions may be performed using the beam corresponding to the second TCI.

As still another example, for a PUSCH transmission associated with a PRACH communication, the PUSCH resources associated with the PRACH can be divided into N groups, where each group may include one or more PUSCH resources. For message A (or "MsgA") transmission, the UE can transmit the MsgA from a PRACH and one associated PUSCH resource group. The UE can apply different beams for different PUSCH resources, where the transmit beam could be spatially correlated to the transmit beam applied for the PRACH. Each PUSCH resource may be used to carry one PUSCH repetition.

Figure 10:
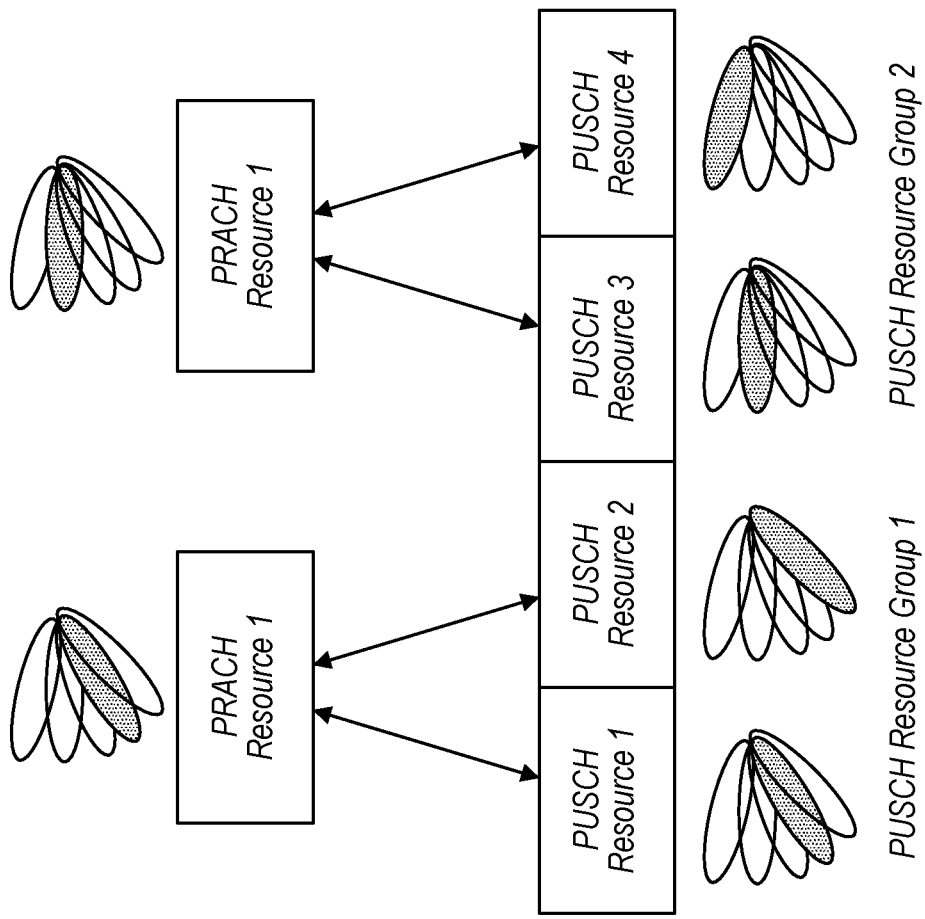

FIG. 10 illustrates aspects of an example scenario in which such mapping between PRACH resources and PUSCH repetitions is used. As shown, in the example of FIG. 10, 2 PUSCH resources may be associated with each of 2 PRACH resources. The first 2 repetitions of the PUSCH transmission may be performed on the PUSCH resources associated with the first PRACH resource, using different transmit beams that may be correlated to the beam of the first PRACH resource in a predefined manner or as configured by higher layer signaling. Similarly, the second 2 repetitions of the PUSCH transmission may be performed on the PUSCH resources associated with the second PRACH resource, using different transmit beams that may be correlated to the beam of the second PRACH resource.

As previously noted herein, it may also be useful to consider how to configure the transmission power for each repetition of a PUSCH transmission that includes multiple repetitions. As one option, the transmission power for each of the multiple PUSCH repetitions may be the same. In this case, common power control parameters may be applied for all of the PUSCH repetitions. For example, in case of DCI format 0_0 or 0_1 scheduling, the power control parameters associated with one SRI/TCI can be used. Which SRI/TCI, if multiple are provided, could be predefined (e.g., SRI/TCI with lowest or highest ID, or corresponding to the first or last repetition, etc.), or could be configured by higher layer signaling or DCI.

As another option, the transmission power could be different for different PUSCH repetitions. For example, certain power control parameters, such as PL-RS, may differ between different repetitions. In such a scenario, the different repetitions may have different power control parameters in accordance with the SRI/TCI associated with them, or may be configured differently in any of various other possible ways.

Note that for a FDM or SDM PUSCH repetition scheme, it could possibly be the case that the total transmission power according to the configured power control parameters would exceed a certain power (e.g., a maximum transmit power according to regulations, a maximum power capability of the UE, etc.), such that the UE may determine to reduce the total transmission power. In such a scenario, as one possibility, the transmission power for each of the resource elements of the PUSCH transmission may be reduced based on a common scaling factor. As another possibility, the power reduction may be performed on one (or a subset) of the PUSCH repetitions.

In the following further exemplary embodiments are provided.

One set of embodiments may include an apparatus, comprising: a processor configured to cause a wireless device to: establish a wireless link with a cellular base station; receive information configuring an uplink transmission on a physical uplink shared channel, wherein at least two repetitions of the uplink transmission are configured; and perform the uplink transmission, wherein at least a first repetition of the uplink transmission is performed using a first beam, wherein at least a second repetition of the uplink transmission is performed using a second beam.

According to some embodiments, the at least two repetitions of the uplink transmission are multiplexed using one or more of: time division multiplexing; frequency division multiplexing; or spatial division multiplexing.

According to some embodiments, the processor is further configured to cause the wireless device to: receive information configuring one or more of: a number of repetitions of the uplink transmission that are configured; or a multiplexing scheme according to which to perform the repetitions of the uplink transmission.

According to some embodiments, the processor is further configured to cause the wireless device to: receive an indication of one or more physical uplink control channel (PUCCH) resources configured for the wireless device; and determine a beam to use for each repetition of the uplink transmission based at least in part on the one or more PUCCH resources configured for the wireless device.

According to some embodiments, the processor is further configured to cause the wireless device to: receive an indication of one or more control resource sets (CORESETs) configured for the wireless device; and determine a beam to use for each repetition of the uplink transmission based at least in part on the one or more CORESETS configured for the wireless device.

According to some embodiments, the processor is further configured to cause the wireless device to: receive an indication of one or more active transmission configuration indicator (TCI) states; and determine a beam to use for each repetition of the uplink transmission based at least in part on the one or more active TCI states.

According to some embodiments, the processor is further configured to cause the wireless device to: receive an indication of one or more sounding reference signal (SRS) resources associated with the uplink transmission; and determine a beam to use for each repetition of the uplink transmission based at least in part on the one or more SRS resources associated with the uplink transmission.

Another set of embodiments may include a wireless device, comprising: an antenna; a radio operably coupled to the antenna; and a processor operably coupled to the radio; wherein the wireless device is configured to: establish a wireless link with a cellular base station; receive information configuring an uplink transmission, wherein the information indicates to perform a plurality of repetitions of the uplink transmission; and transmit the plurality of repetitions of the uplink transmission using at least two different beams.

According to some embodiments, the wireless device is further configured to: receive a beam indication for the uplink transmission, wherein the beam indication includes an indication of one or more sounding reference signal resource indicators (SRIs) associated with one or more sounding reference signals (SRSs); and select a beam associated with a SRS resource indicated by the beam indication for each repetition of the uplink transmission.

According to some embodiments, the beam indication includes an indication of a plurality of SRIs, wherein each SRI is associated with a different SRS resource.

According to some embodiments, the beam indication includes an indication of a SRI that is associated with multiple SRS resources.

According to some embodiments, the beam indication includes an indication of a SRS resource set indicator associated with a subset of or all SRS resources in a SRS resource set.

According to some embodiments, the wireless device is further configured to: receive a beam indication for the uplink transmission, wherein the beam indication includes an indication of one or more transmission configuration indicators (TCIs) to use for the uplink transmission; and select a beam associated with a TCI indicated by the beam indication for each repetition of the uplink transmission.

According to some embodiments, the wireless device is further configured to: determine power control parameters for the plurality of repetitions of the uplink data communication, wherein the power control parameters are determined based at least in part on a specified sounding reference signal resource indicator (SRI) or transmission configuration indicator (TCI) associated with the uplink data communication.

A further set of embodiments may include a method, comprising: by a wireless device: establishing a wireless link with a cellular base station; receiving information configuring an uplink transmission on a physical uplink shared channel, wherein a plurality of repetitions of the uplink transmission are configured; selecting a beam to use for each repetition of the uplink transmission; and transmitting each repetition of the uplink transmission using the beam selected for each repetition.

According to some embodiments, the uplink transmission on the PUSCH is associated with one or more physical random access channel (PRACH) resources, wherein the method further comprises: determining a beam to use for each repetition of the uplink transmission based at least in part on the one or more PRACH resources associated with the uplink transmission.

According to some embodiments, power control parameters for the plurality of repetitions of the uplink transmission are configured commonly across the plurality of repetitions of the uplink transmission.

According to some embodiments, the method further comprises: determining power control parameters for the plurality of repetitions of the uplink transmission, wherein at least one power control parameter differs for different repetitions of the uplink transmission.

According to some embodiments, the method further comprises: determining that a transmission power for the plurality of repetitions of the uplink transmission exceeds a transmission power threshold; and reducing the transmission power for each repetition of the uplink transmission based on a common scaling factor to reduce the transmission power for the plurality of repetitions of the uplink transmission below the transmission power threshold.

According to some embodiments, the method further comprises: determining that a transmission power for the plurality of repetitions of the uplink transmission exceeds a transmission power threshold; and reducing the transmission power for a repetition of the uplink transmission to reduce the transmission power for the plurality of repetitions of the uplink transmission below the transmission power threshold.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A baseband processor configured to:
receive information configuring an uplink transmission on a physical uplink shared channel (PUSCH), wherein at least four repetitions of the uplink transmission are configured; and
perform, as part of a PUSCH transmission occasion, the uplink transmission including at least four consecutive repetitions, wherein first and second consecutive repetitions of the at least four consecutive repetitions are performed using a first beam, wherein the first consecutive repetition is an initial repetition of the uplink transmission during the PUSCH transmission occasion, and wherein third and fourth consecutive repetitions of the at least four consecutive repetitions are performed using a second beam.

2. The baseband processor of claim 1,
wherein the at least two repetitions of the uplink transmission are multiplexed using one or more of:
time division multiplexing;
frequency division multiplexing; or
spatial division multiplexing.

3. The baseband processor of claim 1, wherein the baseband processor is further configured to:
receive information configuring one or more of:
a number of repetitions of the uplink transmission that are configured; or
a multiplexing scheme according to which to perform the repetitions of the uplink transmission.

4. The baseband processor of claim 1, wherein the baseband processor is further configured to:
receive an indication of one or more physical uplink control channel (PUCCH) resources configured for the wireless device; and determine a beam to use for each repetition of the uplink transmission based at least in part on the one or more PUCCH resources configured for the wireless device.

5. The baseband processor of claim 1, wherein the baseband processor is further configured to:
receive an indication of one or more control resource sets (CORESETs) configured for the wireless device; and
determine a beam to use for each repetition of the uplink transmission based at least in part on the one or more CORESETS configured for the wireless device.

6. The baseband processor of claim 1, wherein the baseband processor is further configured to:
receive an indication of one or more active transmission configuration indicator (TCI) states; and
determine a beam to use for each repetition of the uplink transmission based at least in part on the one or more active TCI states.

7. The baseband processor of claim 1, wherein the baseband processor is further configured to:
receive an indication of one or more sounding reference signal (SRS) resources associated with the uplink transmission; and
determine a beam to use for each repetition of the uplink transmission based at least in part on the one or more SRS resources associated with the uplink transmission.

8. A method, comprising:
receiving information configuring an uplink transmission on a physical uplink shared channel (PUSCH), wherein at least four repetitions of the uplink transmission are configured; and
transmitting, as part of a PUSCH transmission occasion, the uplink transmission including at least four consecutive repetitions, wherein first and second consecutive repetitions of the at least four consecutive repetitions are transmitted using a first beam, wherein the first consecutive repetition is an initial repetition of the uplink transmission during the PUSCH transmission occasion, and wherein third and fourth consecutive repetitions of the at least four consecutive repetitions are transmitted using a second beam.

9. The method of claim 8, further comprising:
receiving a beam indication for the uplink transmission, wherein the beam indication includes an indication of one or more sounding reference signal resource indicators (SRIs) associated with one or more sounding reference signals (SRSs); and
selecting a beam associated with a SRS resource indicated by the beam indication for each repetition of the uplink transmission.

10. The method of claim 9,
wherein the beam indication includes an indication of a plurality of SRIs, wherein each SRI is associated with a different SRS resource.

11. The method of claim 9,
wherein the beam indication includes an indication of a SRI that is associated with multiple SRS resources.

12. The method of claim 9,
wherein the beam indication includes an indication of a SRS resource set indicator associated with a subset of or all SRS resources in a SRS resource set.

13. The method of claim 8, further comprising:
receiving a beam indication for the uplink transmission, wherein the beam indication includes an indication of one or more transmission configuration indicators (TCIs) to use for the uplink transmission; and
selecting a beam associated with a TCI indicated by the beam indication for each repetition of the uplink transmission.

14. The method of claim 8, further comprising:
determining power control parameters for the plurality of repetitions of the uplink transmission, wherein the power control parameters are determined based at least in part on a specified sounding reference signal resource indicator (SRI) or transmission configuration indicator (TCI) associated with the uplink transmission.

15. A method, comprising:
transmitting, to a user equipment (UE), information configuring at least four repetitions of an uplink transmission on a physical uplink shared channel (PUSCH); and
receiving the uplink transmission including at least four consecutive repetitions and as part of a PUSCH transmission occasion, wherein first and second consecutive repetitions of the at least four consecutive repetitions are received via a first beam, wherein the first consecutive repetition is an initial repetition of the uplink transmission during the PUSCH transmission occasion, and third and fourth consecutive repetitions of the at least four consecutive repetitions are received via a second beam.

16. The method of claim 15, wherein the at least four repetitions of the uplink transmission are multiplexed using one or more of:
time division multiplexing;
frequency division multiplexing; or
spatial division multiplexing.

17. The method of claim 15, further comprising:
transmitting, to the UE, information configuring one or more of:
a number of repetitions of the uplink transmission that are configured; or
a multiplexing scheme according to which to perform the repetitions of the uplink transmission.

18. The method of claim 15, further comprising:
transmitting, to the UE, an indication of one or more physical uplink control channel (PUCCH) resources configured for the UE.

19. The method of claim 15, further comprising:
transmitting, to the UE, an indication of one or more control resource sets (CORESETs) configured for the UE.

20. The method of claim 15, further comprising:
transmitting, to the UE, an indication of one or more active transmission configuration indicator (TCI) states.

* * * * *